June 27, 1972   P. RUETSCHI   3,673,000
ANTIMAGNETIC ALKALINE MINIATURE GALVANIC CELL
Filed April 27, 1970
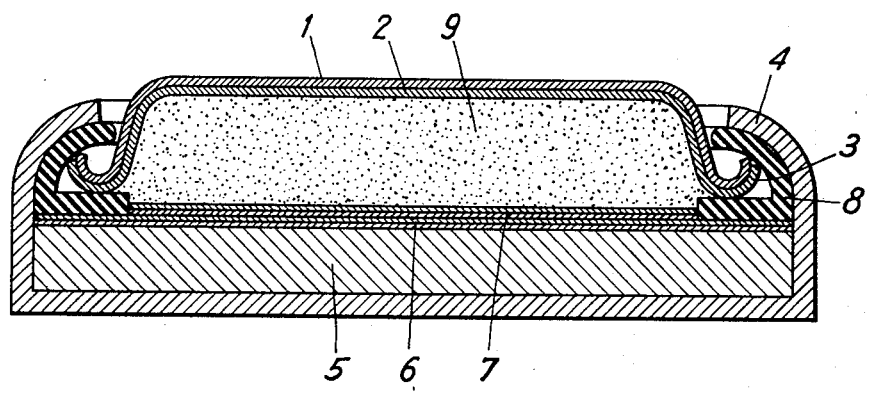

3,673,000
ANTIMAGNETIC ALKALINE MINIATURE GALVANIC CELL
Paul Ruetschi, Yverdon, Switzerland, assignor to Leclanche S.A., Yverdon, Vaud, Switzerland
Filed Apr. 27, 1970, Ser. No. 32,172
Claims priority, application Switzerland, May 1, 1969, 6,702
Int. Cl. H01n 21/00
U.S. Cl. 136—107          7 Claims

ABSTRACT OF THE DISCLOSURE

A non-magnetic alkaline minature galvanic cell having a positive electrode containing a metallic oxide has a nickel alloy housing containing at least 65% nickel and a resilient laminated closure having a spring bronze laminae in electrical contact with the negative electrode.

---

The present invention relates to an antimagnetic miniature element comprising a positive electrode that contains mercury oxide, silver oxide or maganese dioxide, and a negative electrode made of porous amalgamated zinc.

During the development of electronic timepieces it was found that certain advantages as regards accuracy of movement could be derived from the use of a non-magnetic element. The present invention concerns a galvanic element exclusively containing structural parts that are completely antimagnetic.

It is known that positive elecrodes containing heavy metal oxides, particularly mercury oxide or silver oxide, and negative electrodes made of amalgamated zinc, are generally suitable for galvanic miniature elements of the highest current density. The electrolyte consists of a solution of potassium or sodium hydroxide. Galvanic cells of this type are distinguished from the standpoint of constant voltage during discharge and high capacity per volume unit.

The miniature element according to the present invention is characterized in that the housing which lies in electrical contact with the positive electrode, consists of an antimagnetic substantially inelastic nickel alloy containing at least 65% nickel, and in that it has a hardness of not more than 250 Vickers units at the places that are not deformed by bending, and in that the cover which lies in electrical contact with the zinc consists of an elastically resilient antimagnetic laminate.

The invention will now be described by way of example with reefrence to the accompanying drawing.

The cover for the cylindrical button element according to the present invention, having for example a diameter of 11.4 mm. and a height of 3.4 mm., is made from a laminate of two different metals. The inner side may comprise a layer of copper, zinc, tin or their alloys and at least one layer of the laminate should consist of a spring alloy. The interior side 2 preferably consists of a spring bronze that contains 3–15%, preferably 8%, tin and 97–85%, preferably 92%, copper. It may also consist of a spring brass. The exterior layer 1 of the laminate preferably consists of an antimagnetic rust-proof nickel alloy. A suitable material, for example, is known in the trade as "Monel." This material is completely antimagnetic. Its composition is approximately 60–70% nickel, 25–35% copper, and 1–7% iron. This alloy is also distinguished by its strong adherence to bronze.

The antimagnetic laminate of bronze and "Monel" is particularly suitable for the preparation of the cover of alkaline miniature elements that have a zinc electrode. The bronze layer 2 which is in contact with the zinc electrode 9, exhibits in amalgamated condition a very high hydrogen overvoltage. This prevents any hydrogen generation at the cover which could cause an undesirable rise in pressure inside the element.

Beyond what has been said, the cover is distinguished by its excellent elastic behavior. When the cell is closed, the cover is resiliently deformed upon inwardly bending the edge of the element housing 4. This produces a permanent spring action with respect to packing ring 8 and thus serves to impart to the element itself a high degree of imperviousness even after it is stored over long periods.

The resilient cover of a bronze—"Monel" laminate has preferably a relatively high elasticity and a hardness of more than 125 Vickers units for the bronze layer, and more than 250 Vickers units for the "Monel" layer. The thicknesses of the two layers amount to 0.05–0.5 mm., preferably 0.1–0.25 mm. The two layers need not be of the same thickness. It is essential, however, that the bronze layer be sufficiently thick and free of pores, since this prevents the electrolyte from contacting the "Monel" layer and also imparts to the cover the above-mentioned spring action.

The packing ring 8 is made of nylon which is pariculary resistant as regards deformation due to cold-flowing.

The exterior layer of "Monel" constitutes a rust-proof outer surface and permits a low-resistance contact for the connection of the element.

The porous negative electrode of zinc powder 9 is separated from the positive electrode 5 by the separator layers 6 and 7. The positive electrode 5 is in contact with the housing 4 of the cell which forms the positive pole.

In the above-described antimagnetic element, the housing 4 consists of an antimagnetic nickel alloy that contains at least 65% nickel. Alloys of this type are distinguished by their outstanding resistance to corrosion in alkaline electrolytes in the case of mercury oxide or silver oxide electrode potentials. An example of these is the alloy known in the trade as "Inconel 600" which has the following chemical composition:   C, 0.03; Si, 0.18; Cu, 0.04; Fe, 7.32; Mn, 0.09; Mg, 0.017; Cr, 15.5; Ti, 0.26; Al, 0.12; Co, 0.17; Mo, 0.20; Ni, BAL.

The material for housing 4 can be annealed and heat-treated under a protective gas cover which gives it a lowered elasticity and hardness. In contrast to the cover, the metallic housing 4 should be capable of undergoing plastic, rather than elastic, deformation. The antimagnetic housing 4 with its high nickel content is characterized by a Vickers hardness of no more than 250 units, preferably significantly lower.

The antimagnetic miniature element according to the present invention is distinguished by a structure which insures, with given outside dimensions, a maximum inside volume and thus maximum capacity. Moreover, the antimagnetic element according to the present invention is distinguished by the use therein of construction parts that insure outstanding imperviousness. Extended investigations have shown that the materials used for the housing construction must satisfy very specific requirements as regards elastic behavior, hardness and corrosion resistance. The combination of elements used in the above-described element meets these requirements in various respects.

What is claimed is:

1. A non-magnetic alkaline miniature galvanic cell comprising a positive electrode that contains a compound selected from the group consisting of mercury oxide, silver oxide and manganese diozide and a negative electrode comprising porous amalgamated zinc, a non-magnetic substantially inelastic nickel alloy cup-shaped housing in electrical contact with the positive electrode, said alloy containing at least 6% nickel, and an elastically resilient laminated closure disposed in the open end of the housing having a spring bronze laminate in electrical contact with the negative electrode, said spring bronze containing 3% to 15% tin and 97% to 85% copper.

2. A miniature element according to claim 1 characterized in that the cover has an exterior side consisting of an antimagnetic rust-proof nickel alloy layer and an interior side consisting of a layer of copper, zinc, tin or their alloys, wherein ta least one layer of the laminate consists of a spring alloy.

3. The cell of claim 1 wherein one laminae of the cover is spring bronze containing 3 to 15% of tin and 97 to 85% copper and having a hardness of more than 125 Vickers units, said laminae being in electrical contact with the negative electrode.

4. The cell of claim 3 wherein the exterior laminae of the closure is an elastically resilient non-mangetic nickel alloy having a hardness of more than 250 Vickers units.

5. The cell of claim 3 wherein the spring bronze contains 8% tin and 92% copper.

6. A non-magnetic alkaline miniature galvanic cell comprising a non-magnetic nickel alloy housing having a closed end and a substantially cylindrical sidewall terminating in an inwardly extending annular flange about an open end, said alloy containing at least 65% nickel, a positive electrode containing a heavy metal oxide and in electrical contact with the closed end of the housing, a laminated closure for the open end of the housing having an exposed closed end disposed within the said annular flange and lying in a plane substantially parallel to the closed end of the housing and an integral outwardly flaring sidewall which terminates in an outwardly extending flange substantially arcuate shaped in cross section having its edge directed upwardly towards the annular flange of the housing, said laminated closure having a copper, zinc, tin or an alloy thereof alminae adjacent a negative electrode containing amalgamated zinc and an exposed nonmagnetic rust-proof nickel alloy laminae, at least one of the laminae being a spring alloy, and a sealing ring compressed between the annular flange of the housing and the edge of the closure.

7. The cell of claim 6 wherein the inner laminae of the closure is spring bronze.

References Cited

UNITED STATES PATENTS

| | | | |
|---|---|---|---|
| 2,576,266 | 11/1951 | Ruben | 136—107 |
| 3,485,673 | 12/1969 | Jost | 136—102 |
| 3,223,555 | 12/1965 | Solomon et al. | 136—111 |
| 3,205,097 | 9/1965 | Clune et al. | 136—102 |
| 3,457,117 | 7/1969 | Angelovich | 136—107 |
| 2,806,982 | 9/1957 | Holik et al. | 136—133 |
| 2,816,151 | 12/1957 | Ruben | 136—111 |

WINSTON A. DOUGLAS, Primary Examiner

C. F. LeFEVOUR, Assistant Examiner

U.S. Cl. X.R.

136—166